April 8, 1941.  M. H. GROVE  2,237,554
VALVE CONSTRUCTION
Filed July 5, 1938
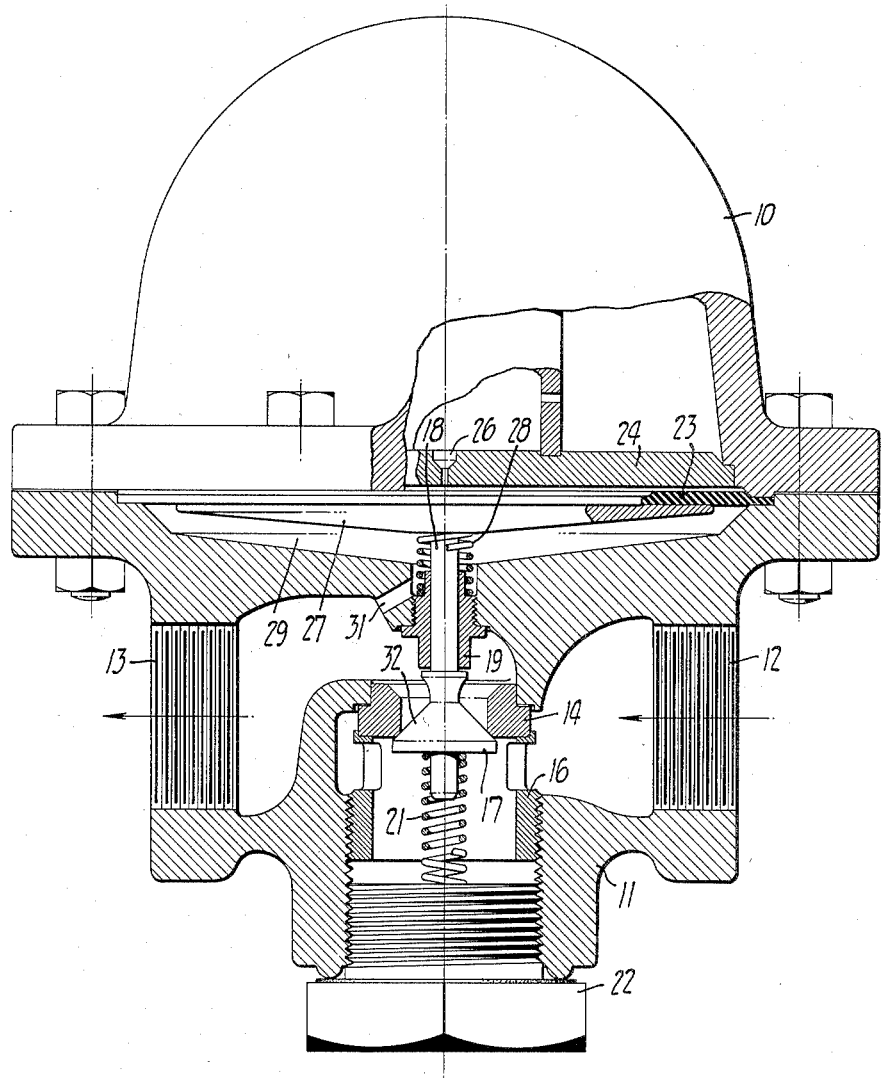
FIG_1_
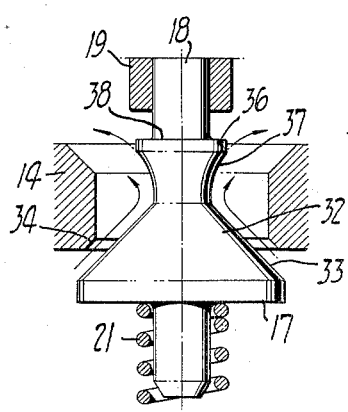
FIG_2_
INVENTOR.
Marvin H. Grove
BY Paul D. Flehr
ATTORNEY.

Patented Apr. 8, 1941

2,237,554

UNITED STATES PATENT OFFICE 2,237,554

VALVE CONSTRUCTION

Marvin H. Grove, Berkeley, Calif.

Application July 5, 1938, Serial No. 217,422

3 Claims. (Cl. 251—27)

This invention relates generally to valves of the type adapted to control the flow of various fluids. In the embodiment illustrated herein the invention is incorporated in a fluid pressure regulator, adapted for the handling of fluids under relatively high pressures.

It is an object of the invention to provide a flow control valve which will avoid unduly rapid erosion of the working parts by virtue of the cutting action of gritty components carried by the fluid. More particularly the present invention is concerned with the construction of flow control valves whereby sand and like gritty components carried with gases or other fluids being handled, will cause a minimum amount of erosion of both the valve seat and its associated valve disc.

Further objects and features of the present invention will appear from the following description in which the preferred embodiment of the invention has been set forth in detail in conjunction with the accompanying drawing.

Referring to the drawing:

Fig. 1 is a side elevational view, partly in cross-section, illustrating a pressure regulator incorporating the present invention.

Fig. 2 is an enlarged detail partly in cross-section, and serving to illustrate operation of the present invention.

For many types of service in which flow control valves are employed, the fluids being handled contain gritty components which cause rapid erosion, thus requiring frequent servicing and replacement of parts. The gritty components may be silicious material like sand, carried by the gas or liquid, the cutting action of which is greatly augmented as the flow rates of the fluid increase. Where relatively high pressures are involved with resultant high rates of flow the cutting action of such gritty components may be so rapid and serious as to virtually preclude the use of ordinary valve designs.

As an example of service where flow control valves are subject to serious erosion and deterioration, reference can be made to the handling of high pressure natural gas from natural gas wells. Flow control valves or pressure regulators used for such service are subject to severe cutting because of the sand and gritty silicious material carried by the natural gas.

I have found that with conventional valves of the type making use of a valve disc cooperating with a conventional annular valve seat, very intense eddy currents are set up within the valve seat, particularly when the valve is near its seat and is subjected to large pressure differentials. Such intense eddy currents cause wire drawing and rapid cutting of the valve seat, and within a relatively short time the erosion has progressed to the point of complete destruction of the valve working surfaces. As will be presently explained the present invention affords a construction for the valve disc and its associated parts, whereby such eddy currents tending to cause erosion of the valve seat are minimized. Furthermore my invention protects the guide bearing for the valve stem from cutting or from the introduction of gritty components.

Referring now to the drawing I have shown the invention incorporated with a fluid regulator of the general type disclosed and claimed in my Patent No. 2,047,101. Briefly, this regulator consists of a dome 10, adapted to contain a predetermined amount of trapped gas under pressure, thus providing the loading which serves to determine the outflow pressure. The main body 11 of the regulator, to which the dome 10 is attached, is provided with inflow and outflow openings 12 and 13. Within the body 11 there is a removable seat ring 14, made of suitable material such as bronze, and which is retained in place by the ported and threaded sleeve 16.

Cooperating with the annular valve seat 14 there is a valve member or disc 17, carried by the concentric valve stem 18. This stem is slidably guided within a bushing 19 which is carried by the body 11. A compression spring 21 serves to urge valve disc 17 towards closed position against seat 14. The upper end of the spring 21 is seated upon disc 17, while its lower end is seated upon the body closure plug 22.

The diaphragm and the dome plate arrangement illustrated is similar to that disclosed and claimed in copending application Serial No. 114,406, filed Dec. 5, 1936. Briefly the diaphragm 23 is formed of suitable flexible material, such as soft vulcanized rubber, "Duprene," or flexible sheet metal, and the peripheral edge portion of this diaphragm is clamped between the dome 10 and the body 11. Extending above the diaphragm is the dome plate 24, and this dome plate is substantially imperforate, being provided with the orifice 26 which connects with the main space of the dome. The lower side of the diaphragm 23 is engaged by the thrust plate 27, and the central portion of this thrust plate abuts the upper end of the valve stem 18. Thrust plate 27 is also independently urged upwardly and retained centered, by means of the compression spring 28.

Assuming that this regulator is for the purpose of maintaining a substantially constant pressure upon the outflow side, irrespective of changes in the demand or changes in the inflow pressure, the chamber 29 below the diaphragm 23 is connected to the outflow side of the regulator, as by means of an opening 31.

Instead of shaping the valve disc 17 in such a manner that its upper side is relatively flat, comparable to its lower side, the upper or outflow side of the valve disc is provided with the substantially conical shaped extension 32. This extension is preferably a continuation of the conical valve working surface 33, which engages the conical working surface 34 of the seat ring 14. It is symmetrical with respect to the center of the valve stem 18, and is preferably integral with the valve disc and stem. Above the upper end of the extension 32, there is an annular flared portion 36. Note that flared portion 36 is tapered as indicated at 37, while its upper end affords a relatively flat annular shoulder 38. As appears in both Figs. 1 and 2, shoulder 38 is in the proximity of the lower end of guide member 19, when the valve is in closed position as shown in Fig. 1.

The general operation of the regulator described above, need not be repeated as it is set forth in said copending application Serial No. 114,406, and said Patent No. 2,047,101. With the chamber 29 communicating with the outflow side of the regulator, movements of the diaphragm occur automatically to determine the position of the valve disc 17, thus causing automatic regulation to maintain the outflow pressure substantially constant. The dome plate 24 serves to automatically control the loading effect of the gas trapped in the dome 10, thereby preventing shattering of the valve disc against the seat ring, and making for accurate regulation. Assuming an open or partially open position of the valve disc shown in Fig. 2, gas rushes through the annular orifice provided between the valve disc and the seat ring 14, but because of the tapered extension 32 the production of intense eddy currents immediately above the valve working surface 34, is prevented or substantially minimized. As a result there is no appreciable tendency for the seat ring to be cut away or eroded. The flow of fluid through the valve is probably in accordance with the arrows appearing on Fig. 2. In other words the flow occurs inwardly and upwardly about the tapered extension 32, with outward deflection of the fluid by the annular flared portion 36. This outward deflection of the flow not only minimizes cutting of the lower portion of stem 18, but it also prevents entrance of gritty material between the guide stem and the guide bushing 19. Therefore the valve stem will continue to be properly guided over relatively long periods of service, with a minimum amount of friction, irrespective of gritty components carried in the flow.

Because of the fact that the flared portion 36 is subjected to the cutting action of gritty components, it is desirable to form this portion of wear-resisting material, such as special hard metal alloys. For this purpose hard wear resisting alloys such as stellite can be employed, or other alloys capable of wear resisting action.

It will be evident that the invention described above is particularly desirable when handling fluids at relatively high pressures, where high flow rates occur through the valve. For example with a regulator as illustrated for the handling of natural gas from pressures as high as 3,000 pounds, to relatively low pressures of a few hundred pounds or less, my invention will make it possible for the regulator to operate satisfactorily for relatively long periods of service, whereas without the invention a few hours operation might suffice to cause serious cutting of the working parts.

I claim:

1. In a flow control valve of the type in which an annular valve disc engages an annular valve seat, with linear movement of the disc in opposite directions relative to the seat to open and close the valve, the disc being disposed on the inflow side of the seat and there being an operating stem disposed axially on the outflow side of the seat and operatively connected to the valve disc; the improvement comprising providing an extension on the outflow side of the disc and axially aligned therewith, the extension being tapered toward the outflow side of the seat, and a portion extending from the smaller end of said extension and flared toward the outlet side of the seat, said flared portion being disposed to act upon fluid flow through said valve seat to cooperate in directing flow of fluid through the valve, the diameter of the flared portion being substantially greater than the diameter of the stem and substantially less than the diameter of the opening through the seat, whereby flow through the seat is not substantially obstructed by said flared portion when the disc is in full open position relative to the seat.

2. In a flow control valve of the type in which an annular valve disc engages a conically shaped seating surface formed on an annular seat ring with linear movement of the disc in opposite directions relative to the seat to open and close the valve, the disc being disposed on the inflow side of the seat ring and there being a reciprocable operating stem for the disc on the outflow side of the seat ring and aligned with the axis of the disc; the improvement comprising providing a substantially conically shaped extension on the outflow side of the disc and axially aligned therewith, said extension being tapered toward the outflow side of the seat ring, and means projecting beyond the small end of said extension to deflect flow longitudinally and then outwardly with respect to the axis of the disc, said means comprising an abrasion resisting portion circular in transverse cross section and extending axially from the smaller end of said extension, said surface being flared toward the outflow side of the seat ring and shaped whereby gas flowing over said conical shaped extension is first deflected longitudinally of the stem and then outwardly from the axis of the stem.

3. In a flow control valve of the type in which an annular valve disc engages a conically shaped seating surface formed on an annular seat ring with linear movement of the disc in opposite directions relative to the seat to open and close the valve, the disc being disposed on the inflow side of the seat ring and there being a reciprocating operating stem for the disc on the outflow side of the seat ring and aligned with the axis of the disc; the improvement comprising providing a substantially conically shaped extension on the outflow side of the disc and axially aligned therewith, said extension being tapered toward the outflow side of the seat ring, and means projecting beyond the small end of said extension to deflect flow longitudinally and then outwardly with respect to the axis of the disc, said means comprising an abrasion resisting portion circular in transverse cross section and extending axially from the smaller end of said extension, said surface being flared toward the outflow side of the seat ring and shaped whereby gas flowing over said conical shaped extension is first deflected longitudinally of the stem and then outwardly from the axis of the stem, the maximum diameter of said portion being greater than the diameter of the stem but not greater than about one-half the diameter of the valve seat opening whereby when said disc is in full open position flow through the valve is not substantially restricted.

MARVIN H. GROVE.